United States Patent
Ling et al.

(10) Patent No.: US 6,782,046 B1
(45) Date of Patent: Aug. 24, 2004

(54) DECISION-DIRECTED ADAPTATION FOR CODED MODULATION

(75) Inventors: Stanley K. Ling, Sacramento, CA (US); Chris Heegard, Santa Rosa, CA (US); Eric J. Rossin, Sebstapol, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/422,406

(22) Filed: Oct. 21, 1999

(51) Int. Cl.$^7$ ............................................. H03K 5/159
(52) U.S. Cl. ......................................... 375/232; 708/323
(58) Field of Search ................................. 375/229, 230, 375/231, 232, 233; 708/323

(56) References Cited

U.S. PATENT DOCUMENTS

| | | | |
|---|---|---|---|
| 5,311,546 A | | 5/1994 | Paik et al. |
| 5,519,398 A | * | 5/1996 | Satoh et al. ................. 341/159 |
| 5,920,834 A | * | 7/1999 | Sih et al. ................ 379/406.06 |
| 5,930,267 A | * | 7/1999 | Daneshrad et al. .......... 390/389 |
| 6,044,107 A | * | 3/2000 | Gatherer et al. ............. 375/222 |
| 6,130,894 A | * | 10/2000 | Ojard et al. ................. 370/421 |
| 6,269,124 B1 | * | 7/2001 | Nagayasu et al. ........... 375/262 |

FOREIGN PATENT DOCUMENTS

| | | | | |
|---|---|---|---|---|
| GB | 2305083 A | * | 3/1997 | ........... H03M/13/00 |

* cited by examiner

*Primary Examiner*—Temesghen Ghebretinsae
*Assistant Examiner*—Pankaj Kumar
(74) *Attorney, Agent, or Firm*—Wade James Brady, III; Frederick J. Telecky, Jr.

(57) ABSTRACT

A method and apparatus for decision-directed adaptation for coded modulation is presented in which a modulation decoder and data re-encoder are used to create an estimated version of a received signal based on the use of a reliable modulation code. An adaptive equalizer is used to process the received signal, and the differences between the received signal passed through the adaptive equalizer and the estimated version are used by the adaptive equalizer to set the equalizer coefficients. A variety of adaptation algorithms can be used including Least Mean Squares (LMS) and Recursive Least Squares (RLS).

26 Claims, 2 Drawing Sheets

DECISION-DIRECTED ADAPTATION FOR CODED MODULATION

BACKGROUND OF THE INVENTION

In a packet-based digital communications system, the properties of a transmission channel must be accurately estimated in order to reliably recover the information in each received packet. In the case of a multiple access network, a packet can be transmitted by any one of several transmitters, each of which is in a different location. This results in different transmission channels from each transmitter. In a mobile wireless network, a single transmitter may change locations between two successive transmissions, resulting in different channel transmission characteristics. In all of these cases, the characteristics of the transmission channel over which the packets travel needs to be estimated to accurately set the receiver parameters and recover the transmitted data. In addition, the receiver parameters need to be periodically adjusted in order to adapt to the changes in the channel characteristics.

In a packet-based communications system, packets are typically composed of message data and a preamble. The preamble contains a data sequence which allows the receiver to estimate the channel parameters.

To adaptively estimate the channel parameters using known techniques such as the Least Mean Squares (LMS) or Recursive Least Squares (RLS), a decision signal and a decision error signal are used to adjust the coefficients of an adaptive equalizer. Such equalizers are well known in the art. The decision signal and decision error signal are obtained either from a training sequence known by both the transmitter and receiver, or by use of a decision-directed method where the receiver uses an estimate of the decision and decision error signals to adjust the receiver parameters.

A known training sequence is frequently used to adapt the equalizer parameters. Since the training sequence is known, the decision is made with absolute certainty and the decision error can be used to precisely determine channel impairments. One drawback with this approach is that the training sequence must be synchronized with the incoming received signal.

In decision-directed adaptation, the decision is made by a hard decision slicer and the system does not utilize the benefit of the coding gain achieved through error control. Decision-directed adaptation can be useful for continually adapting a received signal, but may be sub-optimal with respect to initially converging the adaptive equalizer.

For the foregoing reasons, there is a need for a reliable and efficient method for converging and adjusting adaptive parameters in a communications receiver which simultaneously allows the system to benefit from the coding gain achieved through error control.

SUMMARY OF THE INVENTION

The present invention encompasses a packet based communications receiver which utilizes the overhead portion of a received data packet to converge an adaptive equalizer, and then applies decision-directed adaptation to the received message symbols.

In a preferred embodiment, the overhead symbols are produced using a reliable modulation code, and a modulation decoder is used in combination with a data re-encoder to generate an estimate of the overhead symbol. An equalizer is used to simultaneously generate an equalized version of the received overhead symbol, and the difference between the equalized version and the estimate is used to adjust and converge the coefficients in the adaptive equalizer.

One advantage of the present invention is that reliable or very robust modulation codes can be used in the overhead portion of the data packet, and provide a high degree of certainty that the overhead symbols will be received correctly, even in the absence of equalization. The message portion of the packet can be encoded using less redundant (sparse) codes, resulting in a higher data throughput. The message portion can be received and passed through the adaptive equalizer.

The system can utilize a number of reliable modulation codes including Barker codes, repetition codes, or modulation codes. In a preferred embodiment a rate 1/11 Barker code is utilized.

The system can converge the adaptive equalizer by decoding received overhead symbols to produce an estimate of the overhead data, re-encoding the estimate of the overhead data to generate an estimate of the overhead symbols, and comparing this estimate of the overhead symbols with an equalized version of the overhead symbols. The result of this comparison is a decision error signal which is used to optimize the tap coefficients of the adaptive equalizers. A number of optimization algorithms can be used in the adaptive equalizer and include the Least Mean Squares (LMS) algorithm as well as the Recursive Least Squares (RLS) algorithm.

In a preferred embodiment, delay is introduced in the adaptive equalizer path such that the total delay through the modulation decoder and the data re-encoder is approximately equal to the delay through the delay element and the adaptive equalizer.

In a preferred embodiment, the system comprises a modulation decoder unit which provides modulation decoding of a received digital signal. A data re-encoding unit is coupled to the modulation decoder for generating an estimated signal. An adaptive equalizer unit is provided for equalizing the received digital signal and for producing an equalized signal. A difference unit monitors the difference between the equalized signal and a reference signal which can comprise, for example, the estimated signal. The output of the difference unit is coupled to the adaptive equalizer.

In an alternate embodiment, the system comprises a modulation decoder unit which provides modulation decoding of a received digital signal. A data re-encoding unit is coupled to the modulation decoder for generating an estimated signal. An adaptive equalizer unit is provided for equalizing the received digital signal and for producing an equalized signal. A difference unit monitors the difference between a reference signal (e.g., the estimated signal) and the equalized signal, with the output of the difference unit being coupled to the adaptive equalizer. A slicer generates an output signal containing decisions from the equalized signal. A switch is coupled to the difference unit. During a training period corresponding to reception of the overhead portion, the switch routes the estimated signal to the difference unit. During normal operation corresponding to reception of the message portion, the switch routes the output signal from the slicer to the difference unit.

One advantage of the present invention is that it can be applied to continuous communications systems as well as to packet based systems. In applying the invention to a continuous system, the adaptive equalizer can be periodically trained using reliable modulation codes.

The present invention allows for the rapid and accurate training of an adaptive equalizer, and can result in the reliable reception of data in a number of communications systems including wireless systems. Given the difficult transmission characteristics of many wireless systems, which are subject to multipath fading, Rayleigh fading, and other transmission impairments, the present invention allows an adaptive equalizer to be rapidly trained to accurately recover the data from the received signal.

These and other features and objects of the invention will be more fully understood from the following detailed description of the preferred embodiments which should be read in light of the accompanying drawings.

DETAILED DESCRIPTION OF THE INVENTION

Figure 1:
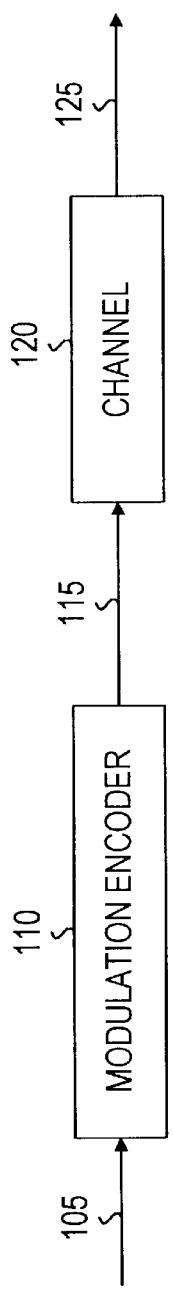
FIG. 1 is a block diagram illustrating a portion of a digital communication system.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 4 in particular, the apparatus of the present invention is disclosed.

FIG. 1 shows part of a digital communications system representing the transmitter and the transmission channel. Information data 105 is processed at a modulation encoder 110 before transmission over a channel 120.

Modulation encoder 110 performs coded modulation over the information data 105 and generates modulation-encoded symbols 115. Coded modulation encompasses the use of forward error correction (FEC) and, e.g., spread spectrum techniques in combination with modulation, and is well known to those skilled in the art. In a preferred embodiment, modulation encoder 110 utilizes a reliable coded modulation scheme which does not need equalization at the receiving end. When used herein, the term "reliable coded modulation scheme" refers to a coded modulation scheme that ensures a high probability of receiving the data correctly, even in a noisy environment or in an environment with severe multipath conditions. The reliable coded modulation scheme is not limited to a particular coding scheme, modulation scheme or combination thereof. In a preferred embodiment, the reliable coded modulation scheme includes a spread spectrum code and a Barker code. Modulation encoder 110 can also utilize other well known coded modulation schemes such as convolutional, block or trellis encoding, all of which require equalization at the receiver.

Figure 2:
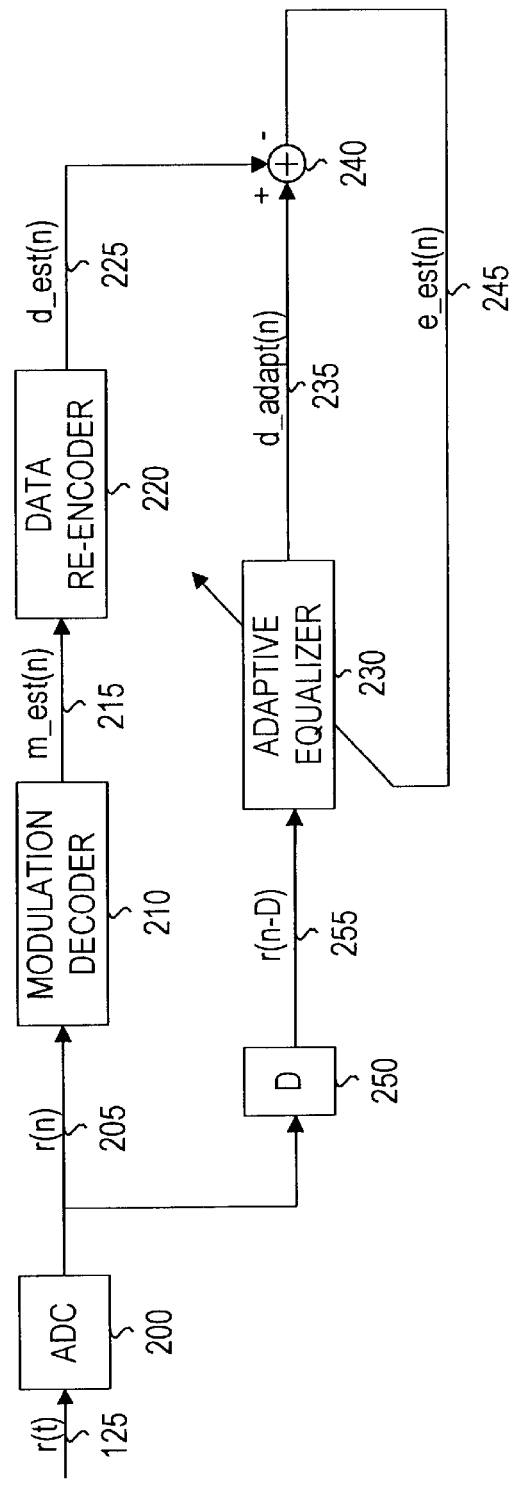
FIG. 2 is a block diagram illustrating a decision-directed adaptation equalizer in a training mode according to the present invention.

In a preferred embodiment, the reliable coded modulation scheme is used to train an adaptive element such as the adaptive equalizer 230 shown in FIG. 2. A standard coded modulation scheme is used during message transmission.

Channel 120 distorts the transmitted modulation encoded symbols 115. Channel 120 can, for example, be a multipath channel with additive white Gaussian noise (AWGN), or can be any other transmission channel with other noise characteristics. The output of channel 120, which is represented as a received signal r(t) 125, is presented to a receiver for recovery of the information data 105.

FIG. 2 shows a decision-directed adaptive equalizer during a training period and utilizing the method of the present invention. During the training period, a reliable coded modulation scheme is used by modulation encoder 110 (FIG. 1). As illustrated in FIG. 2, the received signal r(t) 125 is sampled by an analog-to-digital converter (ADC) 200 whose output is a sequence of received symbols r(n) 205. The received symbols r(n) 205 are fed to both the upper branch (210, 215, 220, 225) and lower branch (250, 255, 230, 235) of the receiver as illustrated in FIG. 2. In the upper branch, modulation decoder 210 decodes the received symbols r(n) 205 to estimate the information sequence. Modulation decoder 210 uses known techniques such as correlation filters, matched filters, maximum likelihood sequence estimators (MLSE), Viterbi decoders or any other data recovery schemes for estimating the information data 105. The output of the modulation decoder 210, m_est(n) 215, which is the estimate of the information data 105, is presented to the input of a data re-encoder 220.

In a preferred embodiment, data re-encoder 220 performs the same operation as the modulation encoder 110 of the transmitter. As an example, for a system using a 4-PAM (Phase Amplitude Modulation) format in modulation encoder 110, data re-encoder 220 would map m_est(n) 215 into the constellation formed by the set {−3,−1,1,3}. The output of data re-encoder 220 is an estimate of the modulation-encoded symbols 115 and is denoted as signal d_est(n) 225. The signal d_est 225 is more reliable than a decision obtained through the use of a hard slicer on the received symbols r(n) 205, because it has been decoded by the modulation decoder 210.

As illustrated in the lower branch of FIG. 2, the received symbols r(n) 205 are delayed by a delay function 250. In a preferred embodiment, the delay introduced by the delay function 250 matches the processing delay in the upper branch. The delayed version of the received symbols r(n) 205 is represented by signal r(n-D) 255 which is fed to the adaptive equalizer 230.

The adaptive equalizer 230 runs an adaptation algorithm such as the LMS or RLS algorithm to converge the coefficients of the adaptive equalizer 230 to an optimum value. During the training period, the output of the adaptive equalizer 230 represented by the equalized signal d_adapt(n) 235 is not yet perfectly equalized. During this time, the decision error e_est(n) 245 computed from the equalized signal d_adapt(n) 235 and the signal d_est(n) 225 are used to optimize the coefficients of the adaptive equalizer 230. The value of the decision error e_est(n) 245 is indicative of how close the equalized signal d_adapt(n) 235 is to the signal d_est(n) 225, which is also a predictive value of the modulation-encoded symbol 115.

In this embodiment, the adaptation algorithm uses reliable decisions made (based on the use of a reliable modulation code) to converge the adaptive equalizer 230 coefficients to their optimum value.

Figure 3:
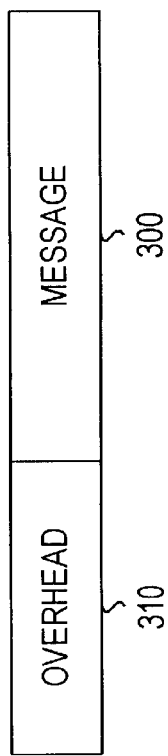
FIG. 3 is a block diagram illustrating a generic packet representation.

FIG. 3 illustrates a generic communication packet. The packet is composed of a message field 300 and an overhead field 310, which contains no message data. The overhead field 310 typically contains a preamble and a header. The preamble can be used to perform channel estimation or to signal the start of a frame, for example. Other uses of the preamble include carrier frequency and phase recovery, and symbol synchronization. The use of preambles in packet based communication systems is well known to those skilled in the art.

A packet based communications system having a generic packet structure as illustrated in FIG. 3 can utilize the method of the present invention. In a preferred embodiment, the adaptive equalizer 230 is trained during the overhead data period and changes over to a standard decision-directed adaptation technique for recovery of the message data. This will be explained in accordance with FIG. 4.

In applying the method of the present invention to a packet based communications system, two different modulation codes can be applied to the packet. In a preferred embodiment, a reliable modulation code is applied to the overhead data contained in the overhead field 310. The modulation code includes a rate 1/11 Barker code or any other modulation code which exhibits robustness with respect to channel distortions. The message data can be encoded with a rate 1/2 binary convolutional code or block code or other appropriate forward error correction code.

Figure 4:
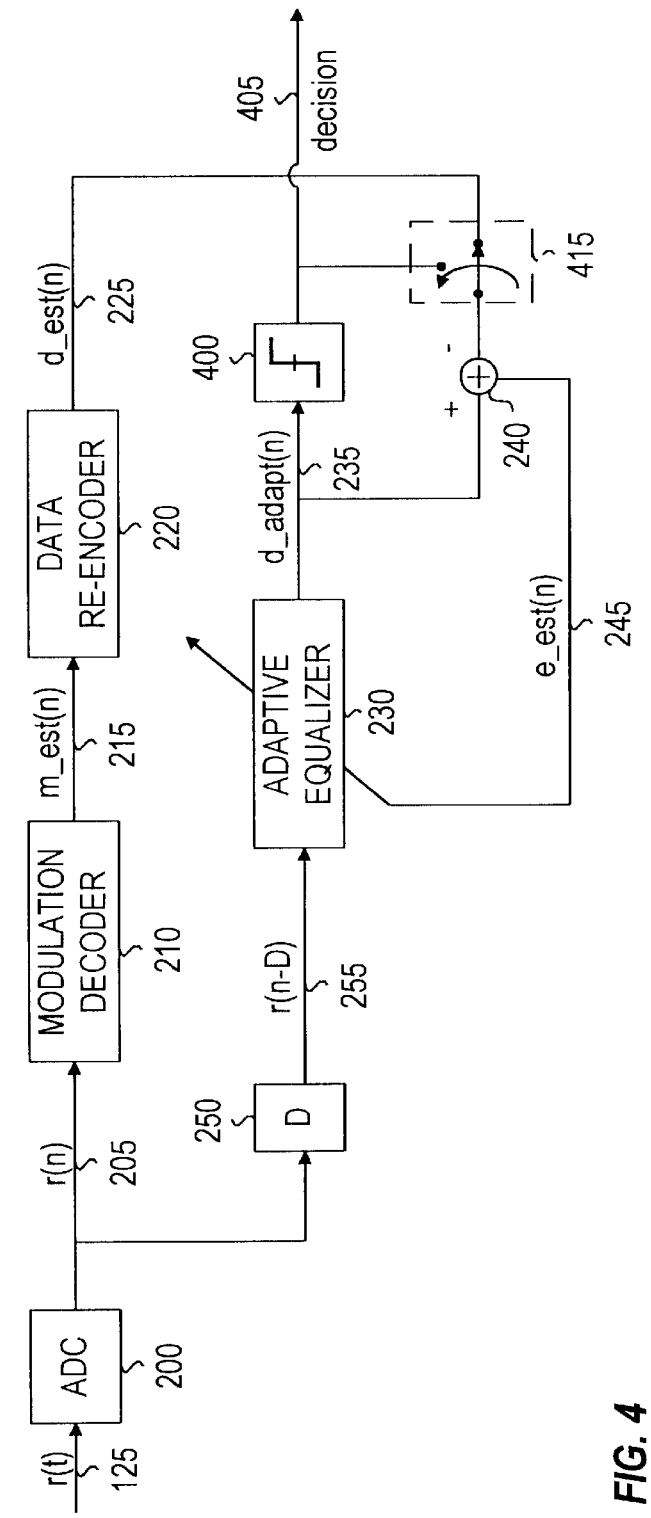
FIG. 4 is a block diagram illustrating a modified decision-directed adaptation equalizer.

FIG. 4 shows a modified decision-directed adaptation system where the known training sequence is replaced by a reliable decision. As illustrated in FIG. 4, in the training period the decision error is computed from the reliable decision provided by the modulation decoder 210, the data re-encoder 220 and the output of the adaptive equalizer 230. The training period occurs during the overhead data. In a preferred embodiment, the length of the overhead data is such that it matches the training period. During the training period, a switch 415 connects the output of the data re-encoder 220 to an input of adder 240.

In the embodiment illustrated in FIG. 4, once the adaptive equalizer 230 is trained, the receiver bypasses the upper branch and performs a standard decision-directed adaptation, well known to those skilled in the art. During the message data, switch 415 connects the output of slicer 400 to an input of adder 240. Slicer 400 makes a hard decision from the equalized version of the received symbol, signal d_adapt(n) 235. The decision error e_est(n) 245 is then computed by subtracting decision 405 from signal d_adapt(n) 235.

The method of the present invention can also be applied to a non-packet based (continuous) communication system. In a continuous communication system, the adaptive equalizer at the receiving end can periodically be trained to adjust its coefficients. In this embodiment, during the periodic training, a reliable modulation code is used to train the adaptive equalizer as described previously with respect to the packet-based communications system.

Referring to FIGS. 2 and 4, the system can be implemented in hardware as part of an Application Specific Integrated Circuit (ASIC) or can be implemented in software using a number of programming languages including C, C++, assembly code, or higher level programming tools and languages well known to those skilled in the art. In either a hardware or software implementation, the blocks represented in FIGS. 2 and 4 can be referred to as units and may be sections of a circuit or code running on a general purpose or specialized processor. Adder 240 can be implemented as a difference unit which determines the difference between the estimated signal produced by the upper branch (or another reference signal) and the equalized signal produced by the lower branch.

As an example of an industrial application of the invention, the system can be used in conjunction with packet based wireless systems in which the packets have an overhead portion and a message portion. During the overhead portion, a reliable modulation code is used in conjunction with the invention as illustrated in FIG. 4 to rapidly converge adaptive equalizer 230. For reception of the message portion, switch 415 allows decision signal 405 to be fed back to adder 240 for the creation of signal e_est(n), which is used by adaptive equalizer 230. The invention can be applied to indoor wireless systems, mobile wireless systems, or fixed wireless systems, and can reduce transmission errors by allowing adaptive equalizer 230 to converge to an appropriate solution for the reliable reception of the data.

Although the present invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. In a packet-based communication system utilizing packets having a message field containing message symbols and an overhead field containing overhead symbols, a method of decision directed adaptation comprising the step of:
   converging an adaptive equalizer from overhead symbols, wherein the reliable modulation code of the overhead symbols is a Barker code, the converging step further comprises the steps of:
   (i) decoding the received overhead symbols to produce an estimate of overhead data;
   (ii) re-encoding the estimate of the overhead data to generate an estimate of the overhead symbols;
   (iii) equalizing the received overhead symbols at an adaptive equalizer to produce an equalized version of the received overhead symbols;
   (iv) computing a decision error from the equalized version of the received overhead symbols and the estimate of the overhead symbols; and
   (v) optimizing the adaptive equalizer coefficients based on the decision error; and applying decision-directed adaptation to the adaptive equalizer using message symbols.

2. The method of claim 1 wherein the reliable modulation code of the overhead symbols is a repetition code.

3. The method of claim 1 wherein the message symbols are produced using a modulation code.

4. The method of claim 1 wherein the optimization step (v) uses a Recursive Least Squares (RLS) algorithm.

5. The method of claim 1 wherein the optimization step (v) uses a Least Mean Squares (LMS) algorithm.

6. In a packet-based communication system utilizing packets having a message field containing message symbols and an overhead field containing overhead symbols, a method of decision directed adaptation comprising the steps of:
   (a) converging an adaptive equalizer from overhead symbols, the converging step (a) further comprises the steps of:
   (i) decoding the received overhead symbols to produce an estimate of overhead data;
   (ii) re-encoding the estimate of the overhead data to generate an estimate of the overhead symbols;
   (iii) equalizing the received overhead symbols at an adaptive equalizer to produce an equalized version of the received overhead symbols;
   (iv) computing a decision error from the equalized version of the received overhead symbols and the estimate of the overhead symbols; and (v) optimizing the adaptive equalizer coefficients based on the decision error; and (b) applying decision-directed adaptation to the adaptive equalizer using message symbols, wherein the decision directed adaptation of step (b) comprises the steps of:
  (i) equalizing the received message symbols at the adaptive equalizer to generate an equalized version of the received message symbols;
  (ii) estimating the message symbols at a slicer wherein the slicer makes a hard decision from the equalized version of the received message symbols;
  (iii) computing a decision error from the equalized version of the received message symbols and the estimated message symbols; and
  (iv) updating the coefficients of the adaptive equalizer based on the decision error.

7. In a decision-directed adaptation system having an adaptive equalizer, a method for converging the adaptive equalizer comprising the steps of:
  (a) decoding a received symbol of a modulation encoded symbol to produce an estimate of information data;
  (b) re-encoding the estimate of the information data to produce an estimate of the modulation encoded symbol;
  (c) equalizing the received symbol after a delay of said received symbol equal to approximately the total delay through the modulation decoder and the data re-encoder to produce an equalized version of the received symbol at the adaptive equalizer;
  (d) computing a decision error from the equalized version of the received symbol and the estimate of the modulation encoded symbol; and
  (e) optimizing the adaptive equalizer coefficients based on the decision error.

8. The method of claim 7 wherein the optimization step (e) is based on the use of a Least Mean Squares (LMS) algorithm.

9. The method of claim 7 wherein the optimization step (e) is based on the use of a Recursive Least Squares (RLS) algorithm.

10. The method of claim 7 wherein the modulation code of the modulation encoded symbol of step (a) is a rate 1/11 Barker code.

11. Apparatus for receiving and decoding digitally communicated signals comprising:
  (a) a modulation decoder providing modulation decoding of a received digital signal;
  (b) a data re-encoder coupled to the modulation decoder for generating an estimated signal;
  (c) an adaptive equalizer for equalizing the received digital signal, wherein the adaptive equalizer produces an equalized signal; and
  (d) a difference unit having an output coupled to the adaptive equalizer, wherein the difference unit monitors the difference between the estimated signal and the equalized signal; and
  (e) a delay element which produces a delay in the received digital signal, and the delay element produces a propagation delay in combination with the adaptive equalizer which is approximately equal to the delay produced by the modulation encoder and the data re-encoder.

12. The apparatus of claim 11, wherein the adaptive equalizer employs a Recursive Least Squares (RLS) algorithm.

13. The apparatus of claim 11, wherein the adaptive equalizer employs a Least Mean Squares (LMS) algorithm.

14. The apparatus of claim 11, further comprising a switch which enables switching to an adaptation mode for reception of a first part of a received digital signal.

15. The apparatus of claim 14, wherein said switch also enables switching to an operation mode for reception of a second part of the received digital signal.

16. The apparatus of claim 11, further comprising a switch which enables switching to an operation mode for reception of a part of the received digital signal.

17. The apparatus of claim 11, further comprising a slicer for generating decisions from the equalized signal.

18. The apparatus of claim 17, further comprising a delay element which produces a delay in the equalized signal.

19. An apparatus for receiving digital packetized messages containing an overhead portion and a message portion comprising:
  (a) a modulation decoder providing modulation decoding of a received digital signal;
  (b) a data re-encoder coupled to the modulation decoder for generating an estimated signal;
  (c) an adaptive equalizer for equalizing the received digital signal, wherein the adaptive equalizer produces an equalized signal; and
  (d) a difference unit having an output coupled to the adaptive equalizer, wherein the difference unit monitors the difference between a reference signal and the equalized signal;
  (e) a slicer for generating an output signal containing decisions from the equalized signal;
  (f) a switch coupled to the difference unit, wherein the switch enables routing of the estimated signal to the difference unit during a training period corresponding to reception of the overhead portion and routing of the output signal to the difference unit during a normal operation period corresponding to reception of the message portion.

20. Apparatus for receiving and decoding digitally communicated signals comprising:
  (a) a modulation decoder providing modulation decoding of a received digital signal;
  (b) a data re-encoder coupled to the modulation decoder for generating an estimated signal;
  (c) an adaptive equalizer for equalizing the received digital signal, wherein the adaptive equalizer produces an equalized signal;
  (d) a difference unit having an output coupled to the adaptive equalizer, wherein the difference unit monitors the difference between the estimated signal and the equalized signal;
  a slicer for generating decisions from the equalized signal;
  a switch coupled to the difference unit, wherein the switch enables routing of the estimated signal to the difference unit during a training period corresponding to reception of the overhead portion and routing of the output signal to the difference unit during a normal operation period corresponding to reception of the message portion; and
  a delay element which produces a delay in the received digital signal, and the delay element produces a delay in combination with the adaptive equalizer which is approximately equal to the delay time produced by the modulation encoder and the data re-encoder.

21. The apparatus of claim 20, wherein the adaptive equalizer employs a recursive least-squares algorithm.

22. The apparatus of claim 20, wherein the adaptive equalizer employs a least-mean squares algorithm.

23. In a packet-based communication system utilizing packets having a message field containing message symbols and an overhead field containing overhead symbols, a method of decision directed adaptation comprising the steps of:
- (a) converging an adaptive equalizer from overhead symbols wherein the modulation code of the overhead symbols is a first coding technique, the converging step (a) further comprises the steps of:
  - (i) decoding the received overhead symbols to produce an estimate of overhead data;
  - (ii) re-encoding the estimate of the overhead data to generate an estimate of the overhead symbols;
  - (iii) equalizing the received overhead symbols at an adaptive equalizer to produce an equalized version of the received overhead symbols;
  - (iv) computing a decision error from the equalized version of the received overhead symbols and the estimate of the overhead symbols; and
  - optimizing the adaptive equalizer coefficients based on the decision error; and
- (b) applying decision-directed adaptation to the adaptive equalizer using message symbols, wherein the modulation code of the message symbols is a second modulation coding technique that is different from the first modulation coding technique.

24. The method of claim 23 further including the step of:
- (vi) delaying the received overhead symbol to produce a delayed version of the received overhead symbol for use in the equalizing step (iii), wherein the delay at the delaying step (vi) combined with the processing delay of the equalizing step (iii) is approximately equal to the sum of the processing delay of the decoding step (i) and the processing delay of the re-encoding step (ii).

25. The method of claim 23 wherein the first modulation coding technique is more reliable than the second modulation coding technique.

26. The method of claim 25 wherein the first modulation coding technique is a Barker code.

* * * * *